(12) United States Patent
Iwai et al.

(10) Patent No.: US 8,215,341 B2
(45) Date of Patent: Jul. 10, 2012

(54) RESIN PIPE WITH MOUTHPIECE AND METHOD OF MANUFACTURING THE SAME

(75) Inventors: Yuka Iwai, Tokyo (JP); Yoji Arakawa, Tokyo (JP); Yasunori Sugihara, Tokyo (JP); Munehito Kawakami, Tokyo (JP); Hiroyuki Nakamura, Tokyo (JP)

(73) Assignees: Fuji Jukogyo Kabushiki Kaisha, Tokyo (JP); The Society of Japanese Aerospace Companies, Tokyo (JP)

( * ) Notice: Subject to any disclaimer, the term of this patent is extended or adjusted under 35 U.S.C. 154(b) by 539 days.

(21) Appl. No.: 12/413,006

(22) Filed: Mar. 27, 2009

(65) Prior Publication Data
US 2009/0260703 A1    Oct. 22, 2009

(30) Foreign Application Priority Data
Apr. 17, 2008  (JP) .................................. 2008-107546

(51) Int. Cl.
*F16L 11/00* (2006.01)
(52) U.S. Cl. ................. 138/109; 138/103; 264/248
(58) Field of Classification Search .................. 138/109, 138/103; 264/248
See application file for complete search history.

(56) References Cited

U.S. PATENT DOCUMENTS

| | | | | |
|---|---|---|---|---|
| 3,425,982 A | | 2/1969 | Fink | 524/413 |
| 4,785,852 A | * | 11/1988 | Okahashi et al. | 138/109 |
| 4,875,717 A | * | 10/1989 | Policelli | 285/222.1 |
| 6,016,848 A | | 1/2000 | Egres, Jr. | 606/200 |
| 6,063,277 A | | 5/2000 | Bennett et al. | 138/137 |
| 2002/0001689 A1 | | 1/2002 | Takeuchi et al. | 428/36.91 |
| 2004/0158275 A1 | | 8/2004 | Crank et al. | 210/321.78 |
| 2006/0054231 A1 | * | 3/2006 | Wolfram et al. | 138/109 |
| 2007/0051418 A1 | * | 3/2007 | Rowles et al. | 138/137 |
| 2009/0260745 A1 | | 10/2009 | Iwai et al. | 156/155 |

FOREIGN PATENT DOCUMENTS

| | | |
|---|---|---|
| JP | 09-277391 | 10/1997 |
| JP | 2001-270005 | 10/2001 |

* cited by examiner

*Primary Examiner* — Patrick F Brinson
(74) *Attorney, Agent, or Firm* — Smith, Gambrell & Russell, LLP

(57) ABSTRACT

Disclosed is a resin pipe with a mouthpiece comprising: a mouthpiece; and a resin pipe of which one end is joined to the mouthpiece, wherein the one end is disposed in the mouthpiece, and an outer peripheral surface of the one end is joined to an inner peripheral surface of the mouthpiece by fusion.

17 Claims, 7 Drawing Sheets

RESIN PIPE WITH MOUTHPIECE AND METHOD OF MANUFACTURING THE SAME

BACKGROUND OF THE INVENTION

1. Field of the Invention

The present invention relates to a resin pipe with a mouthpiece and a method of manufacturing the resin pipe with a mouthpiece.

2. Description of the Related Art

Currently, there has been a demand for the reduction of the weight of an aircraft and a spacecraft. Accordingly, a fiber reinforced resin composite material of which the strength is relatively high has begun to be used for various parts of an aircraft, such as wings and a fuselage.

A metal pipe, such as an aluminum pipe or a titanium pipe, has been generally used as a pipe, which is used for the aircraft and the spacecraft. However, if the pipe is also made of a fiber reinforced resin composite material, the weight of the aircraft and the spacecraft may be reduced.

Currently, as a pipe using a fiber reinforced resin composite material, a sewage pipe (of which the maximum internal pressure is 1.0 MPa or less), which uses the corrosion resistance of a fiber reinforced resin, or the like has been put into practical use in a general industrial field other than an aerospace field.

However, a lightweight property is required for the aircraft and the spacecraft, together with pressure resistance and airtightness (gas barrier properties). With only a fiber reinforced resin composite material, it is difficult to secure airtightness and there is a concern that a medium flowing through the pipe leaks.

A method of manufacturing a fiber reinforced resin composite pipe has been disclosed in Japanese Patent Application Laid-Open (JP-A) Nos. 9-277391 and 2001-270005. JP-A No. 2001-270005 discloses that an inner face-protecting layer (7) made of only a resin is formed in the innermost layer of a fiber reinforced resin composite pipe.

However, JP-A Nos. 9-277391 and 2001-270005 do not disclose a resin pipe with a mouthpiece, that is, a resin pipe to which a mouthpiece used to connect a pipe is joined, or a method of manufacturing the resin pipe with a mouthpiece.

SUMMARY OF THE INVENTION

The present invention addresses the above-identified, and other problems associated with conventional methods and apparatuses, and maintains airtightness at a joint between a mouthpiece and a resin pipe of a resin pipe with a mouthpiece.

According to a first aspect of the preferred embodiments of the present invention, there is provided a resin pipe with a mouthpiece including: a mouthpiece; and a resin pipe of which one end is joined to the mouthpiece, wherein the one end is disposed in the mouthpiece, and an outer peripheral surface of the one end is joined to an inner peripheral surface of the mouthpiece by fusion.

Preferably, the resin pipe is made of a thermoplastic resin.

Preferably, the thermoplastic resin is a liquid crystal polymer.

Preferably, the resin pipe further includes: an outer pipe that is made of a fiber reinforced resin composite material, the outer pipe being formed on an outer peripheral surface of a portion of the resin pipe extending from the mouthpiece and an outer peripheral surface of an end of the mouthpiece from which the resin pipe extends.

According to a second aspect of the preferred embodiments of the present invention, there is provided a method of manufacturing the resin pipe with a mouthpiece, the method includes: forming a resin pipe component of the resin pipe in a cylindrical shape by using a bar of which a coefficient of thermal expansion is larger than that of the mouthpiece; disposing one end of the resin pipe component, which is formed in the cylindrical shape, in the mouthpiece and disposing the bar in the one end of the resin pipe component so that the resin pipe component, the mouthpiece, and the bar are substantially coaxially disposed; and heating the resin pipe component, the mouthpiece, and the bar, wherein external pressure generated by the mouthpiece and internal pressure generated by the bar are applied to the one end by the difference between coefficients of thermal expansion of the mouthpiece and the bar while the resin pipe component is melted by the heating, so that an outer peripheral surface of the one end is pressed against an inner peripheral surface of the mouthpiece, and the outer peripheral surface of the one end is joined to the inner peripheral surface of the mouthpiece by fusion welding.

Preferably, a sheet member, which is made of a resin material of the resin pipe, is wound around the bar desired times, is held in a cylindrical shape, and is heated.

Preferably, the sheet member is made of a liquid crystal polymer.

Preferably, an outer peripheral portion of the bar is made of a rubber material having heat resistance so as to withstand the heating.

Preferably, the resin pipe is made of a liquid crystal polymer, and the rubber material is made of silicon rubber.

Preferably, the bar includes an inner bar and an outer peripheral member that is formed on an outer peripheral surface of the inner bar, and the outer peripheral member is made of a material of which the coefficient of thermal expansion is larger than that of the inner bar.

Preferably, the outer peripheral member is made of a rubber material having heat resistance so as to with stand the heating, and the inner bar is made of metal.

Preferably, the resin pipe is made of a liquid crystal polymer, and the rubber material is made of silicon rubber.

Preferably, the heating is performed after an outer peripheral surface of a portion of the resin pipe component extending from the mouthpiece is covered over an end face of the mouthpiece by a female molding jig that has an inner peripheral surface corresponding to the outer peripheral surface of the resin pipe.

Preferably, the heating is performed while the mouthpiece is fixed to the female molding jig.

Preferably, after the heating, the bar is extracted from the resin pipe while the mouthpiece is fixed to the female molding jig.

Preferably, a heat-resistant tape withstanding the heating is wound around a portion from which the resin pipe extends or an end of the mouthpiece, the inner peripheral surface of the female molding jig is pressed against the heat-resistant tape so that a gap between the mouthpiece and the female molding jig is sealed, the heating is performed while the mouthpiece is fixed to the female molding jig, and the heat-resistant tape prevents the resin of the resin pipe component, which is melted during the heating, from flowing out.

According to a third aspect of the preferred embodiments of the present invention, there is provided a method of manufacturing a resin pipe with a mouthpiece, the method including: inserting an extension portion of a bar-shaped core, which extends from another resin pipe, into a portion of the resin pipe of the resin pipe with a mouthpiece according to claim 1, which extends from the mouthpiece; making an end face of the inserted end reach the inside of the mouthpiece; making an end face of the resin pipe come in contact with an end face of the another resin pipe; and performing heating after a connection portion between the resin pipes is covered with a resin material and a bar is disposed in the resin pipe disposed in the mouthpiece, the bar being made of a material of which the coefficient of thermal expansion is larger than those of the mouthpiece and the core, wherein external pressure generated by the mouthpiece and internal pressure generated by the bar are applied to the one end by the difference between coefficients of thermal expansion of the mouthpiece and the bar while the resin pipes and the resin material are melt by the heating, so that an outer peripheral surface of the one end is pressed against an inner peripheral surface of the mouthpiece, the resin pipe is joined to the another resin pipe by melting so that the resin pipes are integrated.

Preferably, the core is made of a water-soluble material, and the core is dissolved in water so as to be removed after the heating.

Preferably, the heating is performed by bagging the resin pipe or the resin pipe component, the mouthpiece, the bar, and a jig to be attached, and by heating and pressurizing the resin pipe or the resin pipe component, the mouthpiece, the bar, and the jig by using an autoclave.

According to an embodiment of the present invention, in the resin pipe with a mouthpiece, one end of a resin pipe is disposed in a mouthpiece, and an outer peripheral surface of the one end is joined to an inner peripheral surface of the mouthpiece. Accordingly, even though pressure is increased in the pipe, the resin pipe is pressed against the inner peripheral surface of the mouthpiece, so that the adhesion between the resin pipe and the mouthpiece is increased and high airtightness is maintained at a mouthpiece joint according to the increase of the internal pressure. As a result, there is an advantage in that leakage hardly occurs.

According to another embodiment of the invention, when the resin pipe component is heated and melted, an outer peripheral surface of one end of a resin pipe component is pressed against an inner peripheral surface of a mouthpiece by a bar of which the coefficient of thermal expansion is larger than that of a mouthpiece in the method of manufacturing a resin pipe with a mouthpiece. Therefore, it may be possible to obtain an advantage of easily manufacturing the resin pipe with a mouthpiece according to the embodiment of the invention where the outer peripheral surface of one end of a resin pipe is joined to an inner peripheral surface of a mouthpiece.

DESCRIPTION OF THE PREFERRED EMBODIMENTS

An embodiment of the invention will be described below with reference to accompanying drawings. The following description is related to an embodiment of the invention, and does not limit the invention.

[Structure of Resin Pipe With Mouthpiece]

Figure 1:
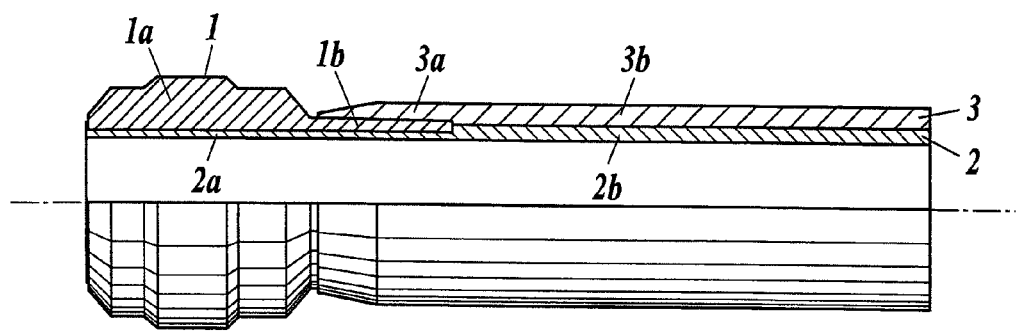
FIG. 1 shows a side of a lower half of a resin pipe with a mouthpiece according to an embodiment of the invention and a cross-section of an upper half of the resin pipe with a mouthpiece.

First, a resin pipe with a mouthpiece according to an embodiment will be described. As shown in FIG. 1, a resin pipe with a mouthpiece includes a mouthpiece 1, a resin pipe 2, and an outer pipe 3. The resin pipe 2 is made of a liquid crystal polymer that is a thermoplastic resin having high gas barrier properties, and the outer pipe 3 is made of a carbon fiber reinforced resin composite material that has high strength and high pressure resistance. Accordingly, since the resin pipe with a mouthpiece has a two-layer structure that includes an airtight layer of the resin pipe 2 and a pressure-resistant layer of the outer pipe 3, the resin pipe with a mouthpiece has high pressure resistance and high airtightness (gas barrier properties).

The mouthpiece 1 is made of metal such as titanium. The mouthpiece 1 includes a mouth 1a and a neck 1b. The mouth 1a is a portion that is to be connected to another pipe. The neck 1b is a portion to which the outer pipe 3 is connected. Inner peripheral surfaces of the mouth 1a and the neck 1b are formed of one continuous cylindrical surface. An outer peripheral surface of the neck 1b is formed in a tapered shape. An outer peripheral surface of one end 2a of the resin pipe 2 is disposed inside the mouthpiece 1 and joined to the inner peripheral surface of the mouthpiece 1 by fusion. An extension portion 2b of the resin pipe 2 extends from the inside of the mouthpiece 1. One end 3a of the outer pipe 3 is joined to the outer peripheral surface of the neck 1b. An extension portion 3b of the outer pipe 3 extends from the neck 1b. An inner peripheral surface of the extension portion 3b of the outer pipe 3 is joined to an outer peripheral surface of the extension portion 2b of the resin pipe 2.

If the resin pipe 2 is disposed outside the mouthpiece 1, a force is applied by internal pressure in a direction where the resin pipe 2 is separated from the mouthpiece 1 by fusion. Accordingly, leakage is apt to occur.

However, according to the resin pipe with a mouthpiece, one end 2a of the resin pipe 2 is disposed inside the mouthpiece 1 and the outer peripheral surface of the one end 2a is joined to the inner peripheral surface of the mouth piece 1. Accordingly, even though pressure is increased in the pipe, the resin pipe 2 is pressed against the inner peripheral surface of the mouthpiece 1, so that the adhesion between the resin pipe and the mouthpiece 1 is increased and high airtightness is maintained at a mouthpiece joint. As a result, leakage hardly occurs.

Further, according to the resin pipe with a mouthpiece, it may be possible to connect not only the pipe according to the embodiment of the invention but also an existing metal pipe by using the mouthpiece 1, and the resin pipe with a mouthpiece may be wholly or partially applied to a piping system.

[Method 1 of Manufacturing Resin Pipe With Mouthpiece]

A method 1 of manufacturing the resin pipe with a mouthpiece will be described below.

Figure 2:
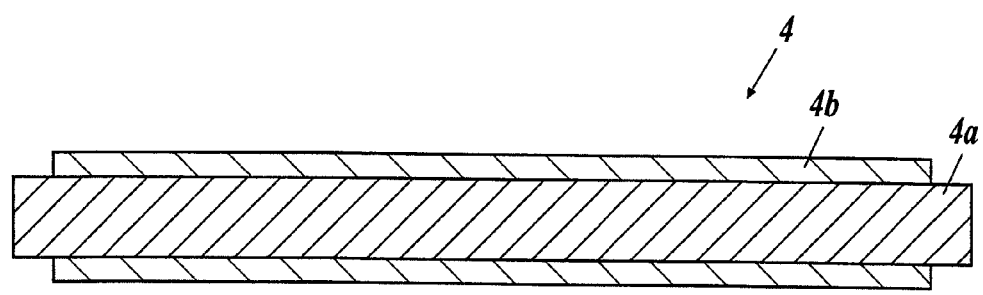
FIG. 2 is a cross-sectional view of a composite bar according to an embodiment of the invention.

The mouthpiece 1 is produced or prepared, and a composite bar 4 shown in FIG. 2 is produced.

Figure 3A:
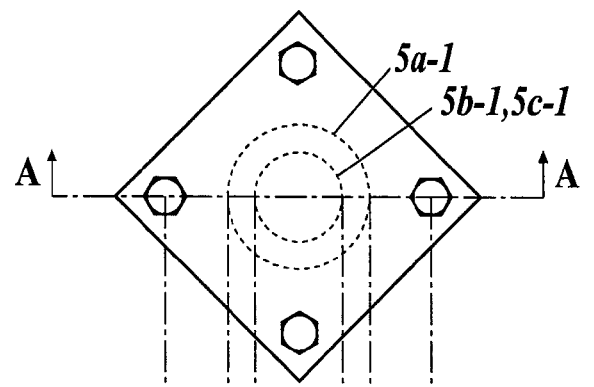
FIG. 3A is a top view of a mold that is used to mold the composite bar according to the embodiment of the invention and FIG. 3B is a cross-sectional view taken along line A-A of FIG. 3A.
Figure 3B:
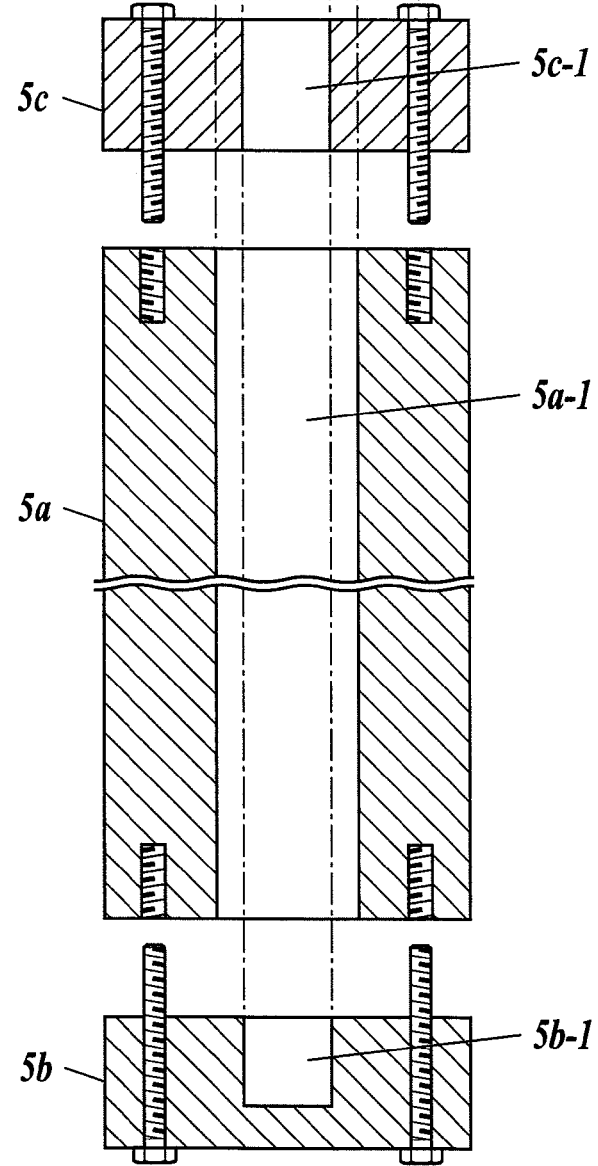

The composite bar 4 includes an inner bar 4a that is made of aluminum, and an outer peripheral member 4b that is made of silicon rubber and formed on the outer peripheral surface of the inner bar 4a. The molding of the outer peripheral member 4b may be performed using a mold as follows: a bottom mold 5b including a hole 5b-1 is connected to a lower end of a main mold 5a, which has a cylindrical space 5a-1 and is opened at both ends thereof, as shown in FIG. 3 so as to cover the lower end of the main mold. Then, a silicon material is poured into the main mold through the upper opening of the main mold 5a, the inner bar 4a is inserted into the main mold, and a lower end of the inner bar 4a is fitted to the hole 5b-1. Subsequently, an upper mold 5c including a hole 5c-1 is connected to the upper end of the main mold 5a, and an upper end of the inner bar 4a is inserted into the hole 5c-1 so that the inner bar 4a is fixed at the central position of the cylindrical space 5a-1. After that, the silicon material is hardened, the mold is opened, and a finished composite bar 4 is taken out.

The coefficient of thermal expansion of the composite bar 4 is larger than that of the mouthpiece 1 as a whole. It is preferable to use the composite bar 4. However, a bar made of only silicon rubber may be used instead of the composite bar 4.

Figure 4:
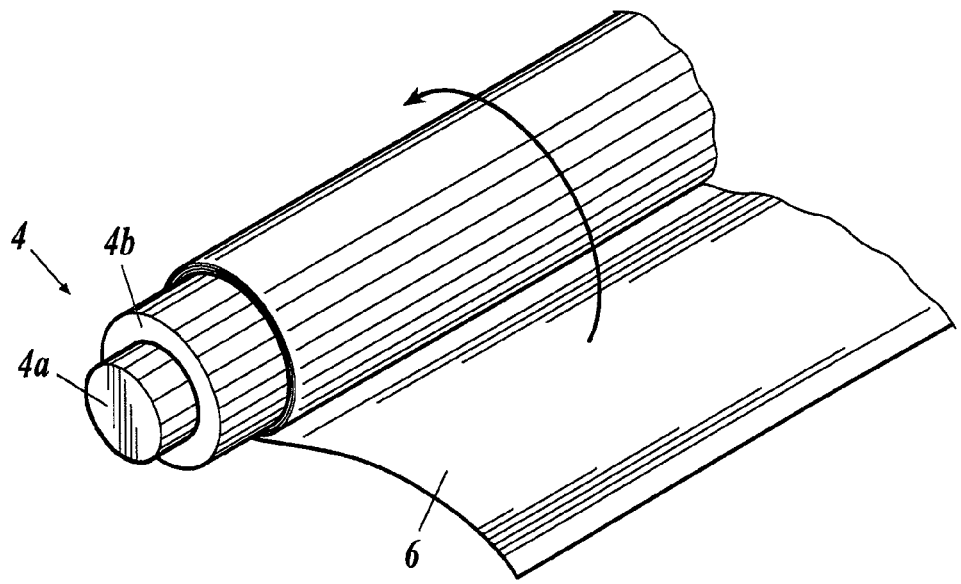
FIG. 4 is a perspective view showing that a sheet member is wound around the composite bar according to the embodiment of the invention.

After the composite bar 4 is obtained, a sheet member 6 made of a liquid crystal polymer is wound around the periphery of the outer peripheral member 4b in a circumferential direction of the outer peripheral member several times as shown in FIG. 4. Then, the sheet member 6 is held in a cylindrical shape. In this case, the sheet member 6 is a resin pipe component. A product on the market may be used as the sheet member made of a liquid crystal polymer. If the sheet member 6 does not have tackiness, a fastener means, such as an adhesive tape or adhesive glue, is used to hold the sheet member 6 in a cylindrical shape. According to the method that winds the sheet member 6, it is easy to accurately and uniformly obtain the desired thickness of the resin pipe 2 by adjusting the thickness of the sheet member 6 and the number of turns of the sheet member.

Figure 5:
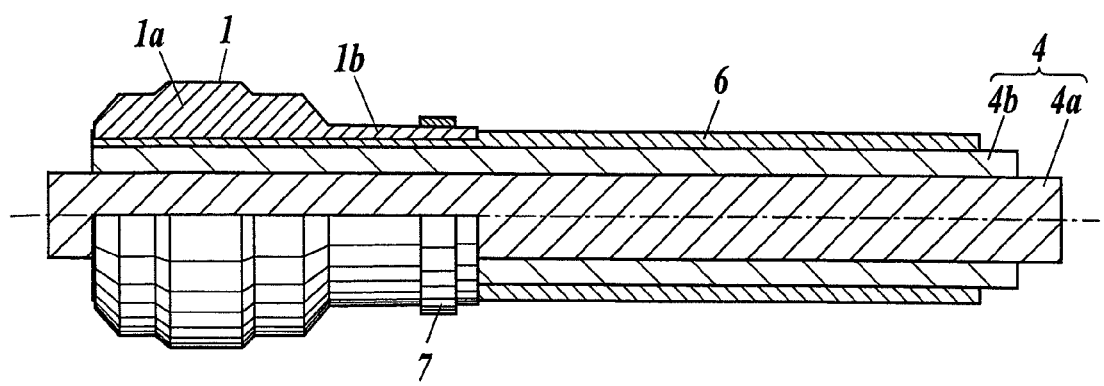
FIG. 5 is a cross-sectional view showing that the composite bar is inserted into a component of the resin pipe with a mouthpiece according to the embodiment of the invention (wherein, a lower half of the mouthpiece is shown by a side view)

After that, as shown in FIG. 5, the composite bar 4 around which the sheet member 6 is wound is inserted into the mouthpiece 1. Accordingly, one end of the sheet member 6 formed in a cylindrical shape is disposed inside the mouthpiece 1 and the bar is disposed inside the one end of the sheet member, so that the sheet member, the mouthpiece, and the bar are substantially coaxially disposed. Further, as shown in FIG. 5, a heat-resistant tape 7 is wound around the neck 1b of the mouthpiece 1.

Figure 6:
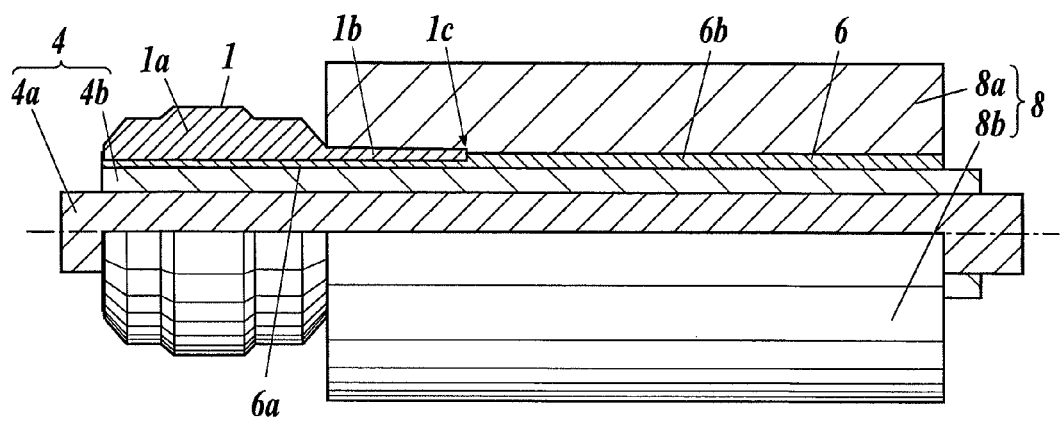
FIG. 6 is a cross-sectional view showing that a jig including a female molding jig is attached to the component of the resin pipe with a mouthpiece according to the embodiment of the invention (wherein, lower halves of the mouthpiece and the female molding jig are shown by a side view)

Subsequently, the above-mentioned assembly is set in a female molding jig 8 as shown in FIG. 6. The female molding jig 8 is a mold that includes an upper mold 8a and a lower mold 8b. The female molding jig has an inner peripheral surface corresponding to the outer peripheral surface of the resin pipe 2, and is divided into the upper mold 8a and the lower mold 8b on a plane passing through the central axis of the assembly.

The mouthpiece 1, the sheet member 6, the composite bar 4, and the heat-resistant tape 7 (not shown in FIG. 6), which are assembled as shown in FIG. 5, are set in the female molding jig as shown in FIG. 6. That is, the neck 1b and the extension portion 6b are interposed between the upper and lower molds 8a and 8b, and the upper and lower molds 8a and 8b are fastened to each other by bolts. Accordingly, the mouthpiece 1 is fixed to the female molding jig 8 and the inner peripheral surface of the female molding jig 8 is pressed against the heat-resistant tape 7, so that a gap between the mouthpiece 1 and the female molding jig 8 is sealed. In addition, the extension portion 6b of the sheet member 6 is covered with the female molding jig 8 over an end face 1c of the mouthpiece 1, so that the entire extension portion is restricted. The reason for this is to prevent the generation of cracks or the occurrence of the local deformation on the finished resin pipe 2 caused by a shear force that is generated in the sheet member 6 at the end face 1c of the mouthpiece 1 due to the expansion of the composite bar 4 during a heating process. Accordingly, a portion of the female molding jig 8 corresponding to the neck 1b is formed in a tapered shape along the neck 1b and has a diameter larger than the diameter of the extension portion 6b. Further, the entire extension portion 6b may be covered with a heat-resistant film for the purpose of the adjustment of the ease of separation of the molds or the degree of molding.

The reason to fix the mouthpiece 1 to the female molding jig 8 is to fix a positional relationship between the mouthpiece 1 and the extension portion 2 of the resin pipe.

The mouthpiece 1, the sheet member 6, the composite bar 4, the heat-resistant tape 7 (not shown in FIG. 6), and the female molding jig 8, which are set as shown in FIG. 6, are bagged. That is, these are put in a heat-resistant bag, and the bag is made to be vacuum and is lashed down. This bag is heated and pressurized by an autoclave in order to perform a heating process.

While the sheet member 6 is melted by the heating process, external pressure caused by the mouthpiece 1 and internal pressure caused by the composite bar 4 are applied to the one end 6a of the sheet member by the difference between the coefficients of thermal expansion of the mouthpiece 1 and the composite bar 4 so that the outer peripheral surface of the one end 6a is pressed against the inner peripheral surface of the mouthpiece 1. Then, the outer peripheral surface of the one end 6a is joined to the inner peripheral surface of the mouthpiece 1 by fusion. Further, during the heating process, the sheet member 6 is molded into the resin pipe 2 by the composite bar 4 and the female molding jig 8.

Furthermore, the heat-resistant tape 7 prevents the resin of the sheet member 6, which is melted during the heating process, from flowing out.

After the heating process is completed, the heat-resistant bag is opened and the composite bar 4 is extracted from the resin pipe 2 while the mouthpiece 1 is fixed to the female molding jig 8. In this case, since the adhesion between a resin and silicon is high, it may be difficult to separate the outer peripheral member 4b, which is made of silicon, from the resin pipe 2. Accordingly, it is preferable that the outer peripheral member 4b be separated from the resin pipe 2 after the inner bar 4a made of aluminum is extracted from the outer peripheral member 4b. The outer peripheral member 4b made of silicon is broken to be separated, and may be recycled.

Figure 7A:
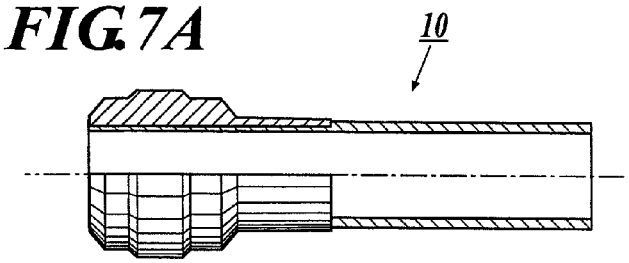
FIGS. 7A to 7D are views illustrating a process for connecting the resin pipe with a mouthpiece according to the embodiment of the invention.

After that, the female molding jig 8 is separated, and the attached heat-resistant tape or the heat-resistant film is separated. Accordingly, a resin pipe with a mouthpiece 10 (shown in FIG. 7A) is obtained.

In reverse to the above-mentioned procedure, if the composite bar 4 is extracted from the resin pipe 2 after the female molding jig 8 is separated, wobble occurs in a direction where a force is applied to an axis of the mouthpiece 1 and the composite bar 4 or the inner bar 4a. Accordingly, there is a concern that the resin pipe 2 is damaged at the end face 1c. For this reason, an appropriate fixing jig is needed. However, according to the procedure, the female molding jig 8 may be used as a fixing jig for the mouthpiece 1 and the extension portion 2b, and the damage of the resin pipe 2 is apt to be avoided.

After that, if the outer pipe 3 made of a carbon fiber reinforced resin composite material is formed around the neck 1b and the extension portion 2b by an existing method, the resin pipe with a mouthpiece according to the embodiment shown in FIG. 1 is obtained.

Figure 7B:
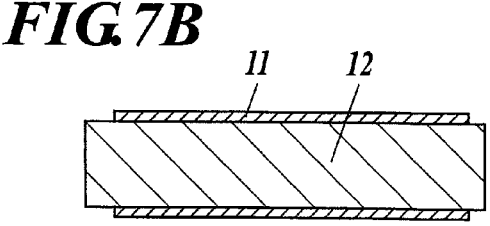
Figure 7C:
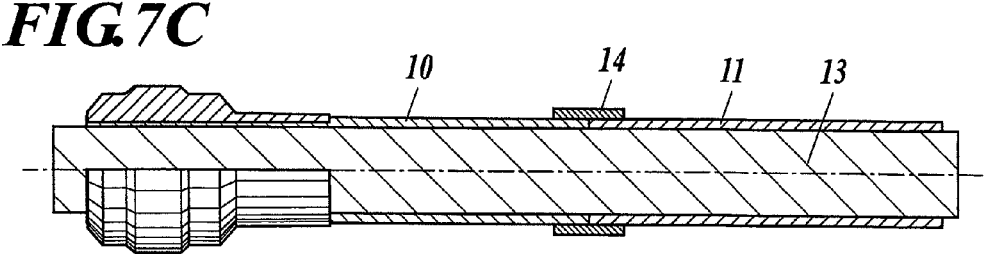

If resin pipes 11, which have one or more kinds of desired length and the same diameter as the resin pipe 2, shown in FIG. 7B are separately produced and connected to the resin pipe 10 with a mouthpiece as shown in FIG. 7C even though the resin pipe 10 with a mouthpiece is short, it may be possible to obtain a pipe having a desired length. In this case, a sheet member made of a liquid crystal polymer is wound around a bar 12 such as an aluminum bar, is bagged, and is molded by an autoclave, so that the resin pipe 11 is manufactured.

Figure 7D:
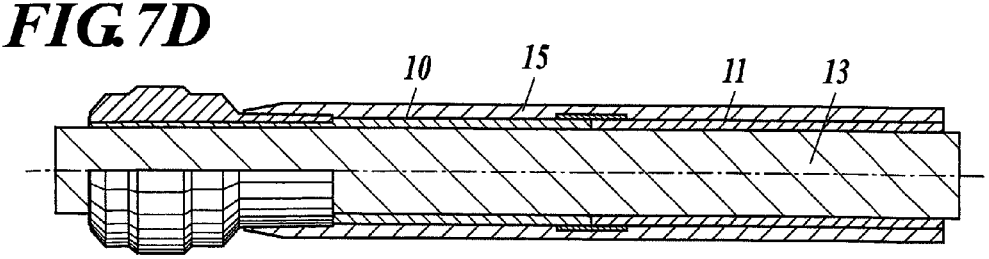

Subsequently, as shown in FIG. 7C, the resin pipe 10 with a mouthpiece and the resin pipe 11 are connected to each other by a bar 13, and a connection portion is covered with a sheet member 14 that is made of a liquid crystal polymer. Then, the pipes are bagged and molded by an autoclave. After that, as shown in FIG. 7D, an outer pipe 15 made of a carbon fiber reinforced resin composite material is formed around the mouthpiece neck and the exposed resin pipe.

Since the above-mentioned method is used, a material of which the coefficient of thermal expansion is larger than that of the inner bar 4a is selected as a material of the outer peripheral member 4b. The reason for this is to effectively expand the outer peripheral surface of the composite bar 4. Not only when the composite bar 4 is used but also when a bar made of only silicon rubber is used, it is preferable that the outer peripheral portion of the bar be made of a rubber material having heat resistance so as to withstand the heating process. The reason for this is to uniformly press the sheet member 6. A material other than silicon may be used as the rubber material. A material of the bar is not limited. As long as a coefficient of thermal expansion is appropriate, the sheet member 6 is uniformly pressed without disadvantageous deformation such as melting during the heating process, and a good result is obtained, any material may be used as the rubber material.

However, according to the trial of the present inventors, the following is found out.

Figure 8:
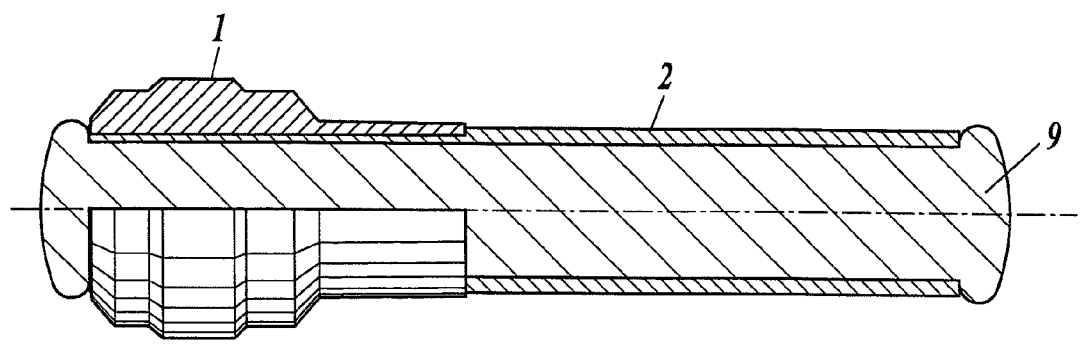
FIG. 8 is a cross-sectional view of the resin pipe with a mouthpiece according to the embodiment of the invention on which a heating process has been performed when a bar made of only silicon rubber is used (wherein, a lower half of the mouthpiece is shown by a side view)

FIG. 8 shows the resin pipe with a mouthpiece on which a heating process has been performed when a bar 9 made of only silicon rubber is used. Since the silicon of the bar 9 is restricted in a radial direction during the heating process, the silicon is significantly expanded in an axial direction and protrudes from the opened ends of the resin pipe 2. In this case, it is difficult to remove the bar 9 from the resin pipe 2. If the outer diameter of the bar 9 is set to be small in anticipation of this result, a large allowance is formed between the mouthpiece 1 and the sheet member 6 that is wound and held around the bar 9. Accordingly, it is difficult to maintain an appropriate positional relationship between the sheet member 6 and the mouthpiece 1, and to obtain good molding results. Further, since the method of extracting the inner bar 4a first after the heating process may not be employed, there remains difficulty in taking out the bar.

The method using the composite bar 4 has been proposed based on the above-mentioned trial result. According to the composite bar 4, it may be possible to obtain a bar, which has an appropriate outer diameter and an appropriate coefficient of thermal expansion, by selecting the materials of the inner bar 4a and the outer peripheral member 4b, and determining the diameters of the inner bar and the outer peripheral member.

[Method 2 of Manufacturing Resin Pipe With Mouthpiece]

A method 2 of manufacturing the resin pipe with a mouthpiece will be described below.

Figure 9:
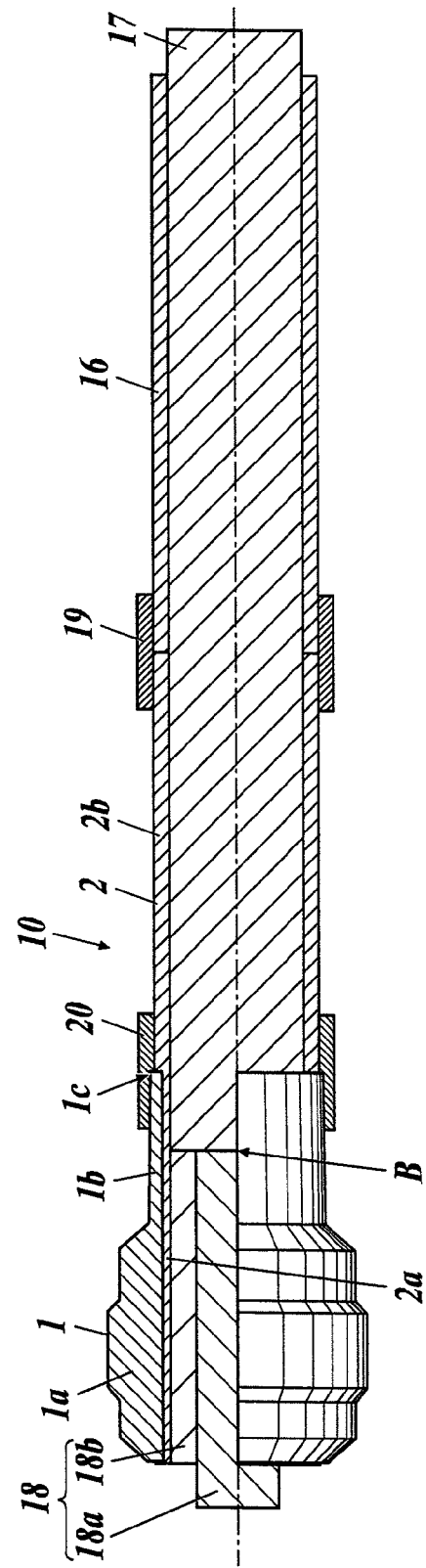
FIG. 9 is a cross-sectional view showing that a resin pipe is connected to a resin pipe with a mouthpiece according to another embodiment of the invention.

This method is a method of connecting a resin pipe 16 to the resin pipe 10 with a mouthpiece as shown in FIG. 9.

The resin pipe 10 with a mouthpiece is produced by the method 1.

The resin pipe 16 is separately produced as follows:

A water-soluble core 17 is obtained by solidifying a water-soluble material such as salt in a mold in the shape of a round bar. The water-soluble core 17 is molded in an arbitrary shape that has a curved portion (not shown) on an axis of the water-soluble core, or in a linear shape that does not have a curved portion on an axis of the water-soluble core.

A sheet member made of a liquid crystal polymer is wound around the water-soluble core 17, is bagged, and is molded by an autoclave so that the diameter of a resin pipe 16 is the same as that of the resin pipe 2.

After that, as shown in FIG. 9, an end of the water-soluble core 17 extending from the resin pipe 16 is inserted into an opening of the resin pipe 2 of the resin pipe 10 with a mouthpiece that is opposite to the mouthpiece 1. In this case, an end face of the inserted end of the water-soluble core 17 reaches a position B in the mouthpiece 1, and an end face of the resin pipe 2 comes in contact with an end face of the resin pipe 16. Meanwhile, a composite bar 18 is disposed in the resin pipe 2 that is disposed in the mouthpiece 1. The composite bar 18 includes an inner bar 18a that is made of aluminum and an outer peripheral member 18b that is made of silicon rubber, like the composite bar 4. However, an end of the composite bar 18, which is inserted into the mouthpiece, has the end faces of the inner bar 18a and the outer peripheral member 18b. During a heating process, the outer peripheral member 18b, which is made of silicon and is to be expanded, is made not to press the extension portion 2b of the resin pipe 2 at the end face 1c. For this purpose, the position B of the end face of the water-soluble core 17 is positioned in the mouthpiece 1. Accordingly, the damage of the resin pipe 2 is prevented at the end face 1c.

A connection portion between the resin pipe 2 and the resin pipe 16 is covered with a sheet member 19 made of a liquid crystal polymer. Further, a portion close to the end face 1c is covered with a sheet member 20 made of a liquid crystal polymer, in order to protect and reinforce the portion close to the end face 1c.

The assembly set as described above is bagged and molded by an autoclave. That is, the resin pipes 2 and 16 and the sheet members 19 and 20 are melted by the heating process, and external pressure generated by the mouthpiece 1 and internal pressure generated by the composite bar 18 are applied to the one end 2a by the difference between the coefficients of thermal expansion of the mouthpiece 1 and the composite bar 18. Accordingly, the outer peripheral surface of the one end 2a is pressed against the inner peripheral surface of the mouthpiece 1, and the resin pipe 2 and the resin pipe 16 are joined to each other by melting so as to be integrated. Since the outer peripheral surface of the one end 2a of the resin pipe is pressed against the inner peripheral surface of the mouthpiece 1 during the melting of the resin pipe 2, the one end 2a and the mouthpiece 1 are not separated from each other and joined to each other by fusion.

After the heating process, the water-soluble core 17 is dissolved in water so as to be removed. Since the water-soluble core is dissolved in water so as to be removed, this method is particularly effective in forming the resin pipe 16 in an arbitrary shape that has the curved portion. Since the core is easily removed, this method is advantageous even in the case of a linear resin pipe 16.

Example

Here, information on one example from which the present inventors have obtained good results will be disclosed in order to refer to the embodiment of the invention.

The inner diameter of a mouthpiece 1 used in this example was 22.04 (mm), the thickness of a sheet member made of a liquid crystal polymer was 0.1 (mm), the outer diameter of an inner bar 4a was 16 (mm), and the outer diameter of an outer peripheral member 4b was 20.64 (mm).

The mouthpiece 1 used in this example was made of titanium (Ti), the inner bar 4a was made of aluminum, the outer peripheral member 4b was made of silicon, and a water-soluble core 17 was made of sodium chloride. The coefficient of thermal expansion of titanium (Ti) was $8.8 \times 10^{-6}$(/° C.). According to the measurement of the present inventors, the coefficient of thermal expansion of the sodium chloride used for the water-soluble core 17 was $41.9 \times 10^{-6}$(/° C.), and the coefficient of thermal expansion of the silicon used for the outer peripheral member 4b was $241.8 \times 10^{-6}$(/° C.). The sheet member, which was made of a liquid crystal polymer and used by the present inventors, was provided from a manufacturer while being wound in the form of a roll. According to manufacturer's specifications, the melting point of the sheet member was 280 (° C.) and the coefficient of thermal expansion thereof was in the range of $-8.3$ to $-12.8 \times 10^{-6}$(/° C.).

A polyimide film on the market was used as a material of each of the heat-resistant tape, the heat-resistant film, and the heat-resistant bag.

The sheet member made of a liquid crystal polymer was wound around the outer peripheral member 4b six times by using a material having the above-mentioned specifications, was bagged, and was heated by an autoclave.

A method of manufacturing a resin pipe may not use a method that winds a sheet member around a bar, without being limited to the embodiment and the example. While a bar is disposed in a resin pipe manufactured by other methods, a mouthpiece may be joined to the resin pipe.

Further, other resin materials may be used instead of a liquid crystal polymer. However, care is taken for securing necessary airtightness and other properties.

Furthermore, other rubber materials and other materials may be used instead of silicon rubber. As long as a coefficient of thermal expansion required for sufficiently pressing the resin pipe against the inner peripheral surface of the mouthpiece is obtained during a heating process, any material may be used instead of silicon rubber.

Materials of the mouthpiece and the inner bar may also be appropriately selected within the scope of the invention.

In the embodiment, the outer pipe made of a fiber reinforced resin composite material has been applied to secure necessary pressure resistance. Depending on use, the resin pipe may be used without the outer pipe.

The entire disclosure of Japanese Patent Application No. 2008-107546 filed on Apr. 17, 2008 including description, claims, drawings, and abstract are incorporated herein by reference in its entirety.

Although various exemplary embodiments have been shown and described, the invention is not limited to the embodiments shown. Therefore, the scope of the invention is intended to be limited solely by the scope of the claims that follow.

What is claimed is:

1. A resin pipe with a mouthpiece comprising:
   a mouthpiece;
   and a resin pipe of which one end is joined to the mouthpiece, wherein the one end is disposed in the mouthpiece, and an outer peripheral surface of the one end is joined to an inner peripheral surface of the mouthpiece by fusion; and wherein
   the resin pipe is made of a thermoplastic resin that is a liquid crystal polymer.

2. The resin pipe with a mouthpiece according to claim 1, further comprising: an outer pipe that is made of a fiber reinforced resin composite material, the outer pipe being formed on an outer peripheral surface of a portion of the resin pipe extending from the mouthpiece and an outer peripheral surface of an end of the mouthpiece from which the resin pipe extends.

3. A method of manufacturing the resin pipe with a mouthpiece according to claim 1, the method comprising: forming a resin pipe component of the resin pipe in a cylindrical shape by using a bar of which an coefficient of thermal expansion is larger than that of the mouthpiece; disposing one end of the resin pipe component, which is formed in the cylindrical shape, in the mouthpiece and disposing the bar in the one end of the resin pipe component so that the resin pipe component, the mouthpiece, and the bar are substantially coaxially disposed; and heating the resin pipe component, the mouthpiece, and the bar, wherein external pressure generated by the mouthpiece and internal pressure generated by the bar are applied to the one end by the difference between coefficients of thermal expansion of the mouthpiece and the bar while the resin pipe component is melted by the heating, so that an outer peripheral surface of the one end is pressed against an inner peripheral surface of the mouthpiece, and the outer peripheral surface of the one end is joined to the inner peripheral surface of the mouthpiece by fusion welding.

4. The method according to claim 3, wherein a sheet member, which is made of a resin material of the resin pipe, is wound around the bar desired times, is held in a cylindrical shape, and is heated.

5. The method according to claim 4, wherein the sheet member is made of a liquid crystal polymer.

6. The method according to claim 3, wherein an outer peripheral portion of the bar is made of a rubber material having heat resistance so as to withstand the heating.

7. The method according to claim 6, wherein the resin pipe is made of a liquid crystal polymer, and the rubber material is made of silicon rubber.

8. The method according to claim 3, wherein the bar includes an inner bar and an outer peripheral member that is formed on an outer peripheral surface of the inner bar, and the outer peripheral member is made of a material of which the coefficient of thermal expansion is larger than that of the inner bar.

9. The method according to claim 8, wherein the outer peripheral member is made of a rubber material having heat resistance so as to withstand the heating, and the inner bar is made of metal.

10. The method according to claim 9, wherein the resin pipe is made of a liquid crystal polymer, and the rubber material is made of silicon rubber.

11. The method according to claim 3, wherein the heating is performed after an outer peripheral surface of a portion of the resin pipe component extending from the mouthpiece is covered over an end face of the mouthpiece by a female molding jig that has an inner peripheral surface corresponding to the outer peripheral surface of the resin pipe.

12. The method according to claim 11, wherein the heating is performed while the mouthpiece is fixed to the female molding jig.

13. The method according to claim 12, wherein after the heating, the bar is extracted from the resin pipe while the mouthpiece is fixed to the female molding jig.

14. The method according to claim 11, wherein a heat-resistant tape withstanding the heating is wound around a portion from which the resin pipe extends or an end of the mouthpiece, the inner peripheral surface of the female molding jig is pressed against the heat-resistant tape so that a gap between the mouthpiece and the female molding jig is sealed, the heating is performed while the mouthpiece is fixed to the female molding jig, and the heat-resistant tape prevents the resin of the resin pipe component, which is melted during the heating, from flowing out.

15. A method of manufacturing a resin pipe with a mouthpiece, the method comprising: inserting an extension portion of a bar-shaped core, which extends from another resin pipe, into a portion of the resin pipe of the resin pipe with a mouthpiece according to claim 1, which extends from the mouthpiece; making an end face of the inserted end reach the inside of the mouthpiece, making an end face of the resin pipe come in contact with an end face of the another resin pipe; and performing heating after a connection portion between the resin pipes is covered with a resin material and a bar is disposed in the resin pipe disposed in the mouthpiece, the bar being made of a material of which the coefficient of thermal expansion is larger than those of the mouthpiece and the core, wherein external pressure generated by the mouthpiece and internal pressure generated by the bar are applied to the one end by the difference between coefficients of thermal expansion of the mouthpiece and the bar while the resin pipes and the resin material are melt by the heating, so that an outer peripheral surface of the one end is pressed against an inner peripheral surface of the mouthpiece, the resin pipe is joined to the another resin pipe by melting so that the resin pipes are integrated.

16. The method according to claim 15, wherein the core is made of a water-soluble material, and the core is dissolved in water so as to be removed after the heating.

17. The method according to claim 3, wherein the heating is performed by bagging the resin pipe or the resin pipe component, the mouthpiece, the bar, and a jig to be attached, and by heating and pressurizing the resin pipe or the resin pipe component, the mouthpiece, the bar, and the jig by using an autoclave.

\* \* \* \* \*